United States Patent [19]
Kai et al.

[11] Patent Number: 5,549,244
[45] Date of Patent: Aug. 27, 1996

[54] THERMALLY CONTROLLED VALVE FOR INTERNAL COMBUSTION ENGINES

[75] Inventors: Kazuyuki Kai; Masahisa Hamano; Hitoshi Homma; Akira Mori; Takashi Masuko, all of Tokyo, Japan

[73] Assignee: Nippon Thermostat Co., Ltd., Tokyo, Japan

[21] Appl. No.: 375,109

[22] Filed: Jan. 19, 1995

[30] Foreign Application Priority Data

Dec. 9, 1994 [JP] Japan ................................. 6-306403

[51] Int. Cl.$^6$ ............................................. F01P 7/02
[52] U.S. Cl. ................... 236/34.5; 236/93 A; 165/300
[58] Field of Search ........................ 236/34.5, 93 A; 251/210, 120; 137/625.33; 165/40

[56] References Cited

U.S. PATENT DOCUMENTS 4,630,770  12/1986  Silger et al. ............................ 236/34.5

*Primary Examiner*—John M. Sollecito
*Attorney, Agent, or Firm*—Longacre & White

[57] ABSTRACT

The present disclosure concerns a thermally controlled valve, such as may be installed in the cooling water system of internal combustion engines. The thermally controlled valve eliminates thermal hunting as the temperature of the cooling water increases by restricting the initial flow of cooling water. Subsequently, additional cooling water flow is permitted as the temperature of the cooling water further increases.

6 Claims, 12 Drawing Sheets

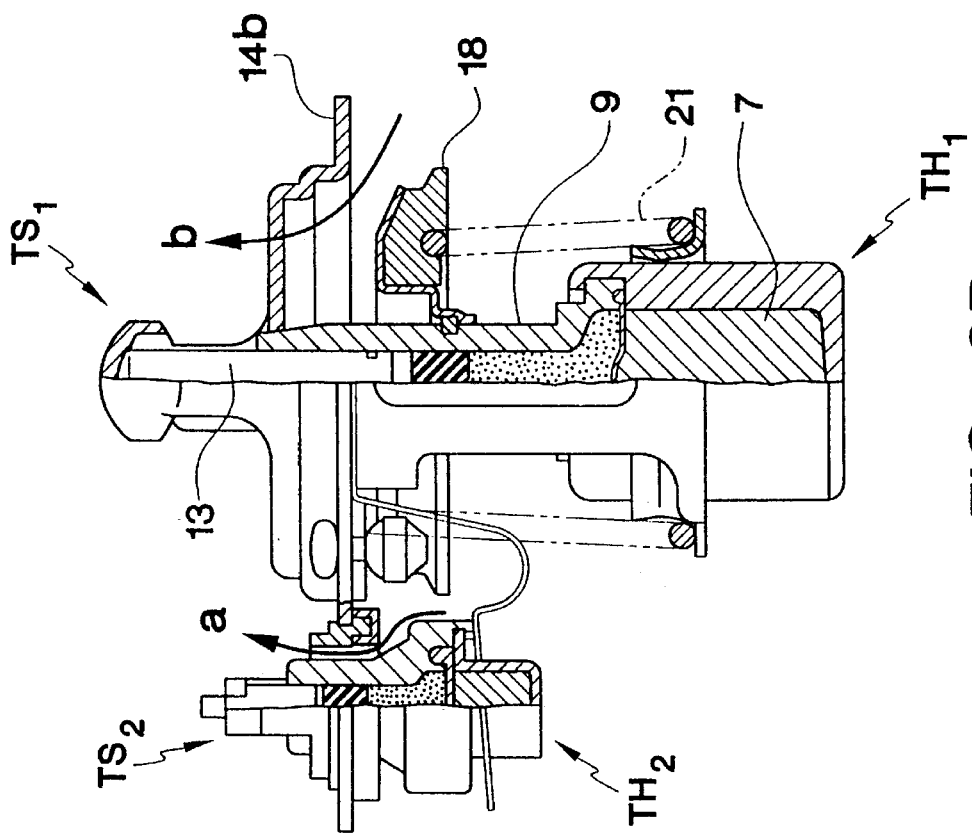
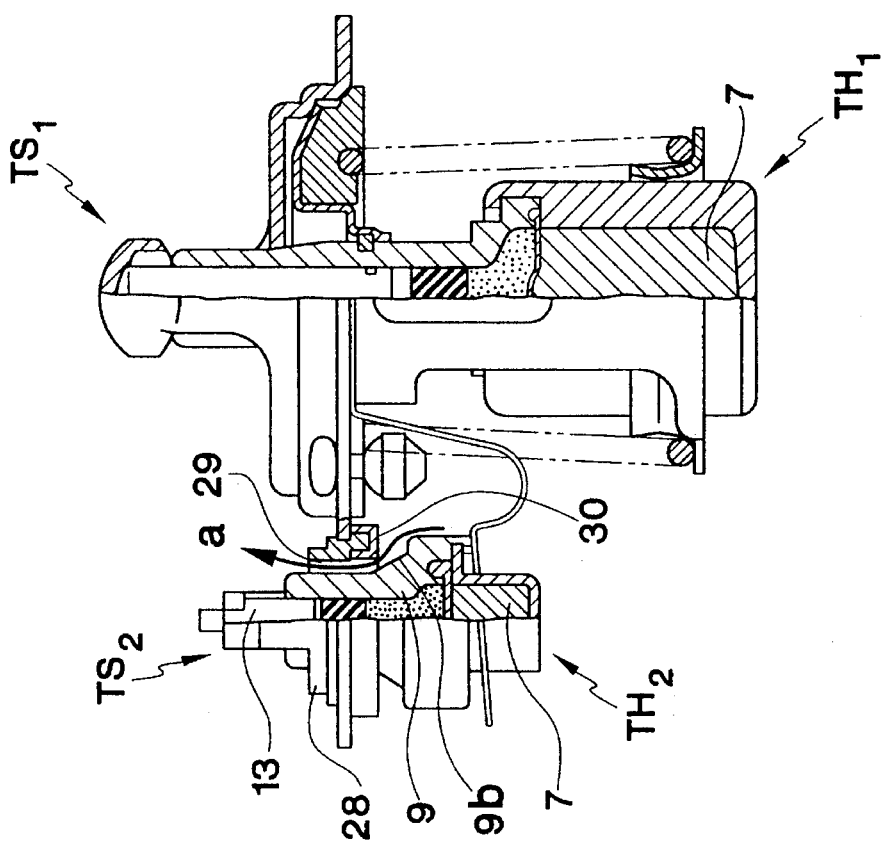
FIG. 6A
FIG. 6B

SPACING BETWEEN VALVE ELEMENT AND VALVE SEAT (mm)

5,549,244

THERMALLY CONTROLLED VALVE FOR INTERNAL COMBUSTION ENGINES

BACKGROUND OF THE INVENTION a) Field of the Invention

The invention concerns a thermally controlled valve provided in the cooling water system of an internal combustion engine. In particular, the present invention concerns a thermally controlled valve located between an engine and a radiator for regulating the flow of cooling water therebetween. A thermally controlled valve according to the present includes a valve stem which is relatively movable with respect to a valve seat. The relative movement is controlled by thermal expansion and contraction of a moving unit in response to temperature changes of the cooling water.

b) Description of Related Art

FIG. 1 schematically illustrates a conventional arrangement including a water jacket 2 through which cooling water circulates around the cylinders of an engine block 1. The water jacket 2 is connected to a radiator 3 by passageways $4_1$ and $4_2$. A water pump 5 for circulating the cooling water is positioned proximate to a inlet 2a to the water jacket 2. A cooling water bypass $4_3$ is provided between the cooling water passageways $4_1$ and $4_2$. A thermally controlled valve TS' is provided in passageway $4_1$ through which cooling water is moved from the outlet of the water jacket 2 to the inlet of the radiator 3. Circulation of the cooling water is regulated by the thermally controlled valve TS'.

Operation of the thermally controlled valve TS' located in passageway $4_1$ of the conventional arrangement is influenced not only by the temperature, but also the pressure of the cooling water (i.e. the discharge pressure of the water pump in addition to the vapor pressure). Consequently, delays occur in opening the conventional valve TS' even though the specified temperature for operating the thermally controlled valve TS' is surpassed. Additionally, the conventional valve TS' instantaneously goes from a completely closed position to a fully open position when the specified operating temperature is surpassed.

In the aforementioned conventional arrangement, the phenomenon known as "overshoot" occurs when the valve TS' suddenly opens and cool water in the radiator surges into the water jacket 2 thereby lowering the cooling water temperature below the operating temperature of the valve TS'. In response, the valve TS' shuts immediately. This phenomenon is known as "undershoot". Repeated overshoot and undershoot cause thermal hunting, or vacillation, which in turn causes instability in the temperature of the water jacket 2.

Unstable temperatures in the water jacket 2 reduce the service life of the engine, as well as deteriorate the fuel economy of the engine. Additionally, fluctuations in the temperature of the water jacket 2 adversely affect the climate control systems for the vehicle and, in vehicles equipped with cooling water temperature gauges, cause the driver to misinterpret the status of the cooling system.

FIG. 2 shows a conventional vertical two-stage thermally controlled valve TS' which reduces thermal hunting by reducing the surge of cool water from the radiator 3, i.e. reducing the initial flow rate of cooling water. Conventional thermally controlled valve TS' includes a thermo-element TH, a case 6, and a thermally expanding unit 7 which relies on thermal expansion/contraction of a mixture of paraffin and copper powder housed in the case 6. Conventional valve TS' further includes a diaphragm 8 made of nitrile rubber, for example, to seal the thermally expanding unit 7 within the case 6, and a guide cylinder 9 connected with the opening into the case 6 sealed by the diaphragm 8. The guide cylinder 9 includes, in succession from the diaphragm 8, a fluid 10, a rubber piston 11, a back-up plate 12 made of poly-tera fluoro-ethylene (PTFE), for example, and a moving unit piston 13. Additionally, the valve TS' includes a valve seat body 14, and a support unit 15 mounted on top of the valve seat body 14 and which pushes on the moving unit piston 13 via a spring (unnumbered). A flange 14a of the valve seat body 14 is fastened to an interior surface 17a of an elastic ring 17 having sealing projections $16_1$, $16_2$ and $16_3$ on the upper, lower and radially outer surfaces, respectively. The elastic ring 17 is set in a corresponding housing of the passageway $4_1$ so as to mount the thermally controlled valve TS'. The valve TS' further includes a valve seat 14b proximate to the flange 14a of the valve seat body 14.

A first valve element 18 having a radially inner surface is slidably supported on the guide cylinder 9 of the thermo-element TH, a radially outer surface 18a of the first valve element 18 is adapted to contact the valve seat 14b, a plurality of circulation holes 18b are proximate to the radially inner surface of the first valve element 18, and a bottom surface 18c of the first valve element 18 which is proximate to the circulation holes 18b contacts a top surface of 6a of the case 6.

A second valve element 19 functions as a rigid pushing plate. A radially inner surface 19b of the second valve element 19 is fixed to the guide cylinder 9 of the thermo-element TH, and a radially outer surface 19a of the second valve element 19 is spaced from and faces a planar top surface 18d of first valve element 18. A circulation hole 19d is radially spaced between the outer surface 19a and the inner surface 19b.

A first spring 20 is mounted in compression between the second valve element 19 and the first valve element 18. A second spring 21 is mounted in compression between the first valve element 18 and a frame 22 fixed to the bottom side of the flange 14a of the valve seat body 14.

A guide hole 22a is formed in a lower portion of the frame 22. The case 6 of the thermally controlled valve TH is slidably supported in the guide hole 22a.

A third valve element 25 is slidably supported on extension 23 from the bottom of the case 6 of the thermally controlled valve TH. A stopper 24 at the tip of the extension 23 retains the third valve element 25 on the extension 23. A third spring 26 is mounted in compression between the third valve element 25 and the case 6 of the thermally controlled valve TH. The third spring 26 pushes the third valve element 25 toward a valve seat 27 formed by the cooling water bypass $4_3$.

The function of the vertical 2-stage thermally controlled valve TS' will now be described. When the temperature of the cooling water increases, the thermally expanding unit 7 in the thermally controlled valve TH expands (FIG. 3A). The moving unit 13, fixed with respect to the supporting unit 15, provides a reaction member against which the thermo element TH is displaced. The second valve element 19, fixed with respect to the guide cylinder 9, is also displaced so as to separate the tip 6a of the case 6, also fixed with respect to the guide cylinder 9, from the bottom 18c of the first valve element 18.

Initially a small amount of cooling water flows as indicated by arrow "a" through the gap between tip 6a and the bottom 18c, the circulation hole 18b, and circulation hole 19d.

As the temperature of the cooling water further increases, the thermally expanding unit 7 continues to expand against the moving unit 13 so as to further displace the guide cylinder 9 and the case 6. Subsequently, the outer circumferential surface 19a of the second valve element 19, fixed with respect to the guide cylinder 9, pushing against the planar surface 18d of the first valve element 18 separates the outer circumferential surface 18a of the first valve element 18 from the valve seat 14b. This allows the cooling water to flow not only as indicated by arrow "a", but also through the gap between the valve seat 14b and the outer circumferential surface 18a, as indicated by arrow "b".

As described above, a small amount of water is designed to flow initially as the temperature increases. This prevents a large amount of cold water from flowing immediately, thereby reducing thermal hunting.

Inasmuch as reference numerals are consistently used to identify corresponding elements described with respect to the aforementioned conventional vertical 2-stage type thermally controlled valve, the description of these elements will not be repeated herein.

FIGS. 4–6 illustrate another conventional thermally controlled valve having a sub-valve to reduce thermal hunting. A main valve $TS_1$ and a thermo-element $TH_1$, similar to the above valve TS' and thermo-element TH, are mounted eccentrically from the center of the valve seat 14 (toward the right in FIG. 4). A sub-valve or a sub-thermally controlled valve $TS_2$, including a thermo-element $TH_2$ used in the sub-thermally controlled valve $TS_2$, are mounted eccentrically from the center of the valve seat 14 (toward the left in FIG. 4). The sub-thermally controlled valve $TS_2$ has nearly an identical structure to that of TS' and $TS_1$.

Differences between the main thermally controlled valve $TS_1$ and the sub-thermally controlled valve $TS_2$ include:

1) the tip end of the moving unit 13 in the thermo-element $TH_2$ is held eccentrically from the center of the valve seat body 14 by a supporting unit 28;
2) the guide cylinder 9 has a smaller diameter at an upper portion 9a and a larger diameter at a lower portion 9b;
3) a circulation passageway 29 is formed between the upper portion 9a and the holding unit 2; and,
4) a spring plate 31 biases the lower portion 9b into contact with a valve seat 30, thereby closing the passageway 29.

The operation of the thermally controlled valve having a sub-valve as illustrated in FIGS. 4 and 5 will now be described. As shown in FIG. 6(A), an increase in cooling water temperature causes the thermally expanding unit 7 of the thermo-element $TH_2$ to expand. The moving unit 13, fixed with respect to the supporting unit 28, provides a reaction member against which the thermo-element $TH_2$ is displaced. This displaces the guide cylinder 9 such that the lower portion 9b separates from the valve seat 30, whereupon the cooling water flows through the circulation passageway 29 as indicated by arrow "a".

FIG. 6(B) shows that as the temperature of the cooling water further increases, the thermally expanding unit 7 in the thermo-element $TH_1$ expands against the moving unit 13 so as to further displace the guide cylinder 9. Subsequently, the first valve element 18 fastened to the guide cylinder 9 is separated from the valve seat 14b, against the opposition of the spring 21. This allows the cooling water to flow not only through the circulation passageway 29, as indicated by arrow "a", but also through the gap between the valve seat 14b and the first valve element 18, as indicated by arrow "b".

As set forth above, the sub-valve is first opened with an initial increase in the temperature of cooling water to allow a small amount of water to flow between the radiator and the engine. Consequently, a large amount of the cold water is prevented from flowing immediately after the valve is actuated, and thermal hunting is reduced.

The vertical 2-stage thermally controlled valve shown in FIGS. 2 and 3, or the thermally controlled valve having a sub-valve shown in FIGS. 4–6 reduce thermal hunting. However, these conventional valves include many parts which have to be assembled. Because the structures are fairly complex, production of the conventional valves is costly, and the valves are susceptible to failure. Additionally, conventional two-stage valves are also heavier than thermally controlled valves having a single stage.

SUMMARY OF THE INVENTION

An objective of the present invention is to provide a thermally controlled valve having a modified structure which streamlines the construction and improves durability of the valve while eliminating thermal hunting.

BRIEF DESCRIPTION OF THE DRAWING

FIGS. 6A and 6B illustrate the operation of the conventional thermally controlled valve having a sub-valve shown in FIGS. 4 and 5.

DESCRIPTION OF THE PREFERRED EMBODIMENT

Figure 8:
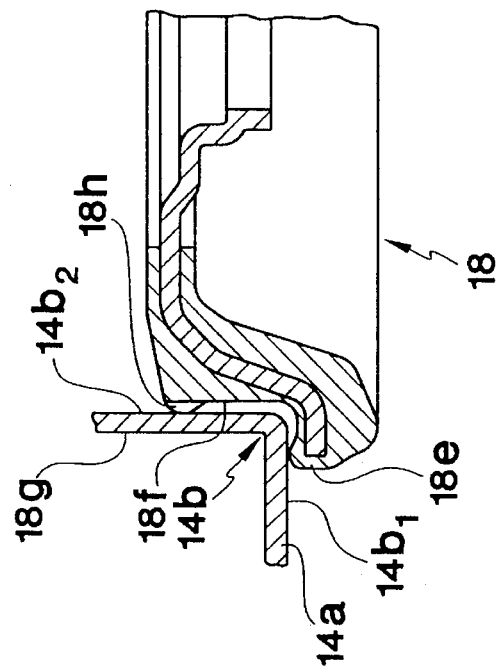
FIG. 8 is an enlarged segment view showing a valve element and a valve seat according to the present invention (in a closed position).
Figure 7:
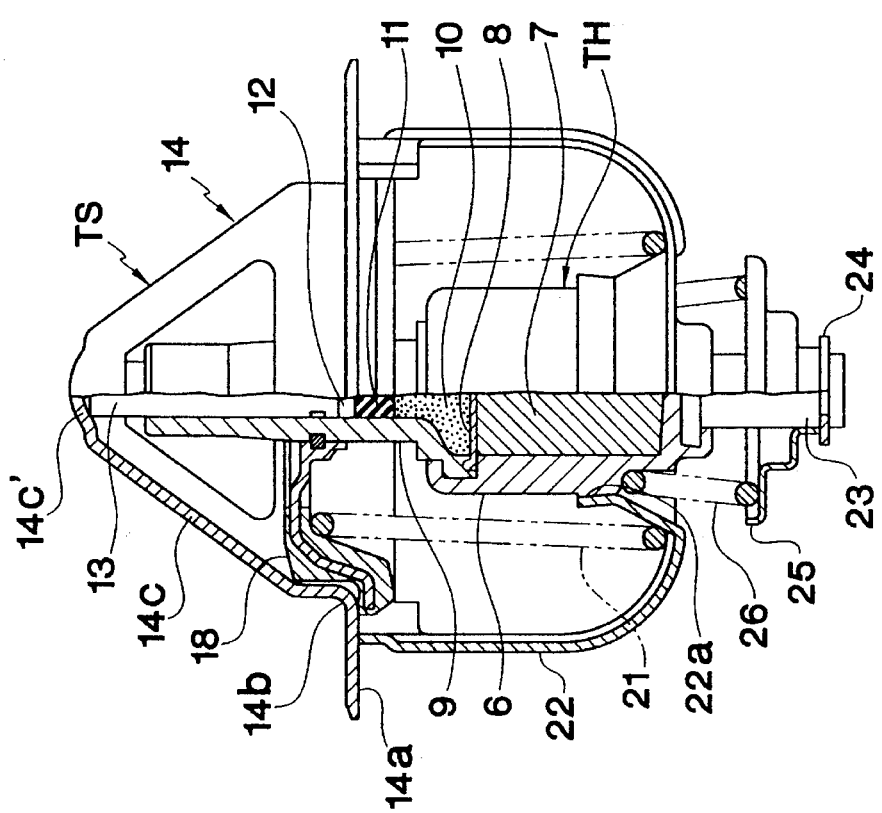
FIG. 7 is a cross-section view showing a thermally controlled valve according to the present invention (in a closed position).

A first thermally controlled valve according to the present invention, as shown in FIGS. 7–9, solves the aforementioned disadvantages of conventional thermally controlled valves, and may be provided in cooling water systems for internal combustion engines to regulate the flow of cooling water.

The thermally controlled valve is comprised of a valve element 18, fastened to a guide cylinder 9 of a thermoelement TH, and a valve seat 14b. The thermo element TH detects changes in the cooling water temperature and causes relative movement between the valve seat 14b and the valve element 18.

The valve seat 14b includes a substantially horizontal portion $14b_1$ and a substantially vertical portion $14b_2$, both of which come contact with and separates from the valve element 18.

The valve element 18 includes a substantially horizontal portion 18e with a raised ring lip which contacts with and separates from the horizontal portion $14b_1$. The valve element 18 also includes a substantially vertical portion 18f having a raised ring lip 18g which contacts with and separates from the vertical portion $14b_2$. At least one cooling water passageway 18h (two are described in this case) is provided on the vertical portion 18f in a direction substantially orthogonal to the ring lip 18g.

Figure 11:
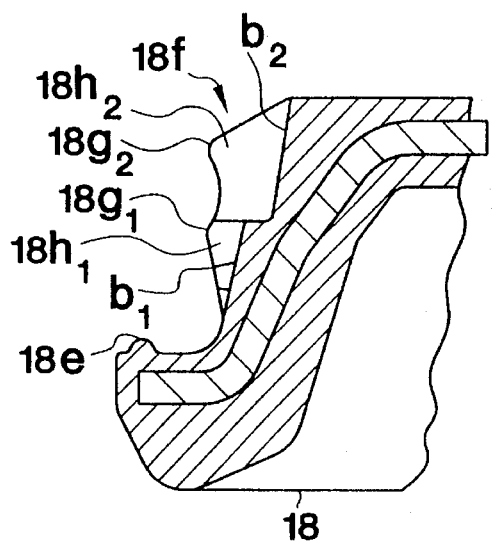
FIG. 11 is an enlarged segment view showing a valve element according to the present invention.

A second thermally controlled valve according to the present invention, shown in FIGS. 10 and 11, is also comprised of a valve element 18, fastened to a guide cylinder 9 of a thermo-element TH, and a valve seat 14b. The thermo element TH detects changes in the cooling water temperature and causes relative movement between the valve seat 14b and the valve element 18.

The valve seat 14b includes a substantially horizontal portion $14b_1$ and a substantially vertical portion $14b_2$, both of which come contact with and separates from the valve element 18.

The valve element 18 includes a substantially horizontal portion 18e which contacts with and separates from the horizontal portion $14b_1$. The valve element 18 also includes a substantially vertical portion 18f having a two rings lips $18g_1$ and $18g_2$ which contact with and separate from the vertical portion $14b_2$. At least one pair of cooling water passageways $18h_1$ and $18h_2$ (two pairs are described herein) are provided on the vertical potion 18f in a direction substantially orthogonal to the ring lips $18g_{12}$ and $18g_2$.

Figure 12A:
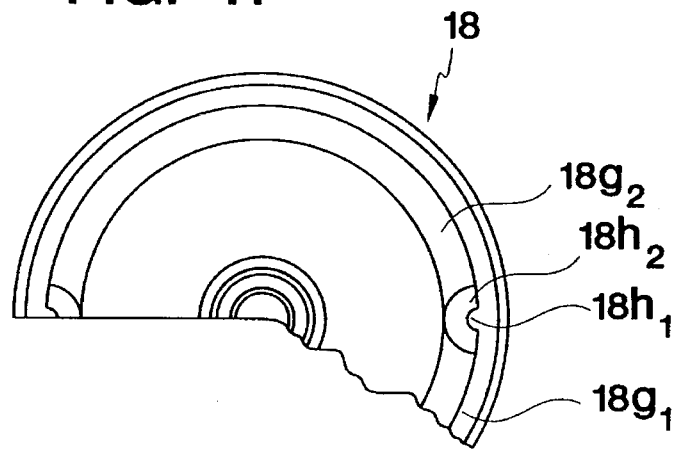
FIGS. 12A and 12B are enlarged segmental views showing a first aspect of the thermally controlled valve according to the present invention.
Figure 12B:
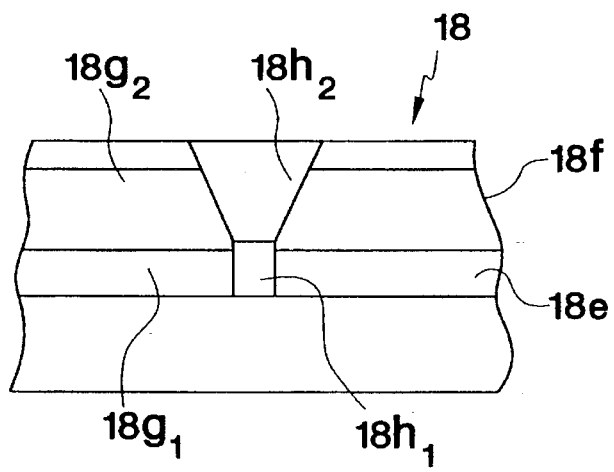
Figure 13A:
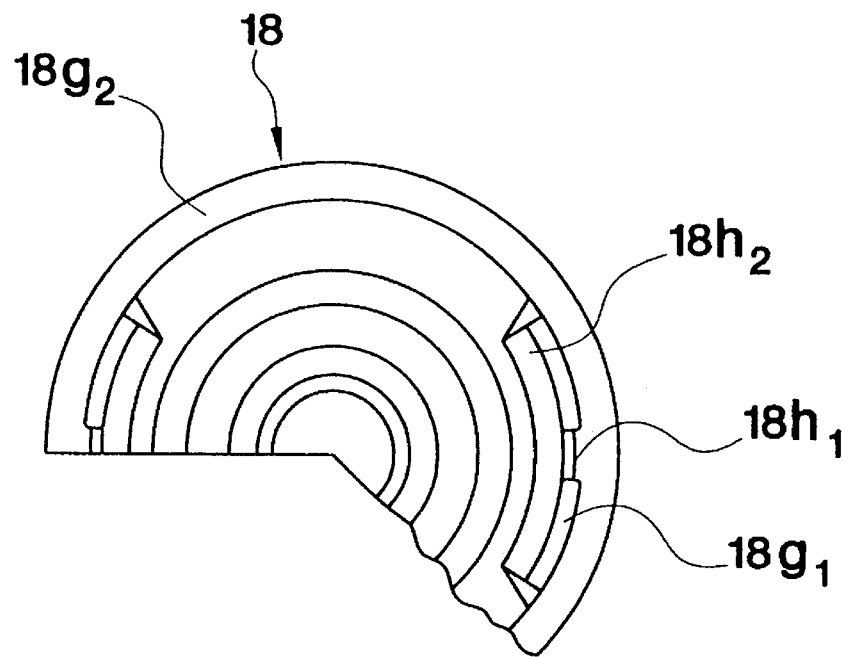
FIGS. 13A and 13B are enlarged segmental views showing alternate version of the first aspect of the thermally controlled valve according to the present invention.
Figure 13B:
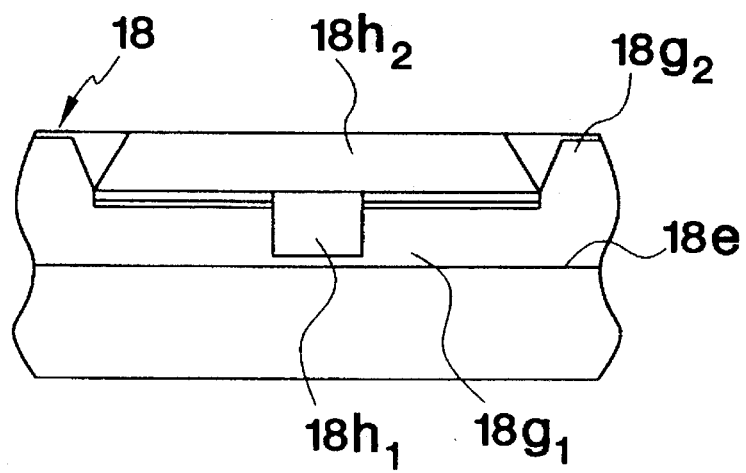
Figure 14A:
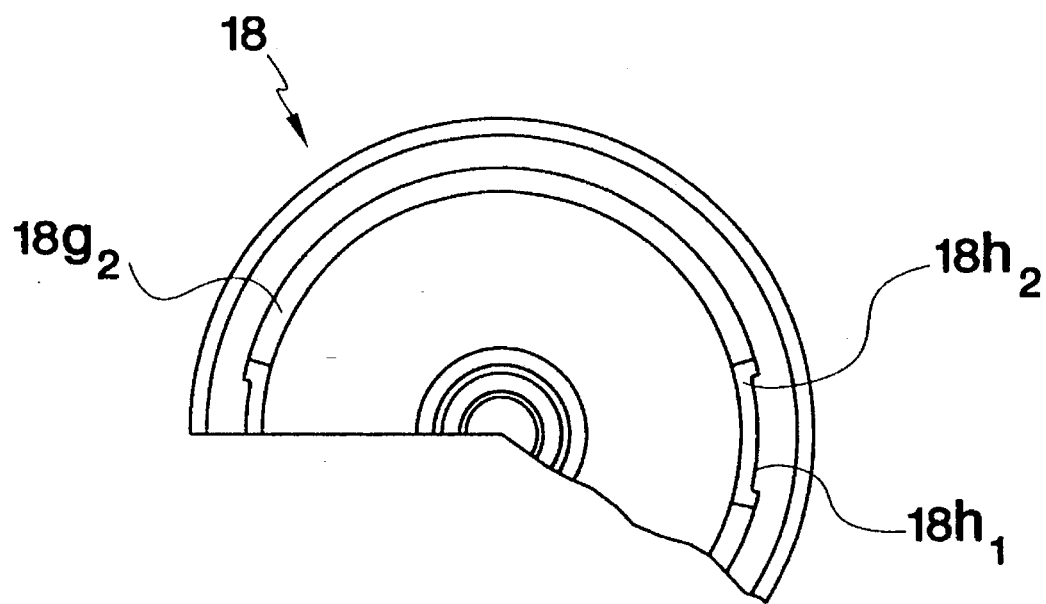
FIGS. 14A and 14B are enlarged segmental views showing another alternate version of the first aspect of the thermally controlled valve according to the present invention.
Figure 14B:
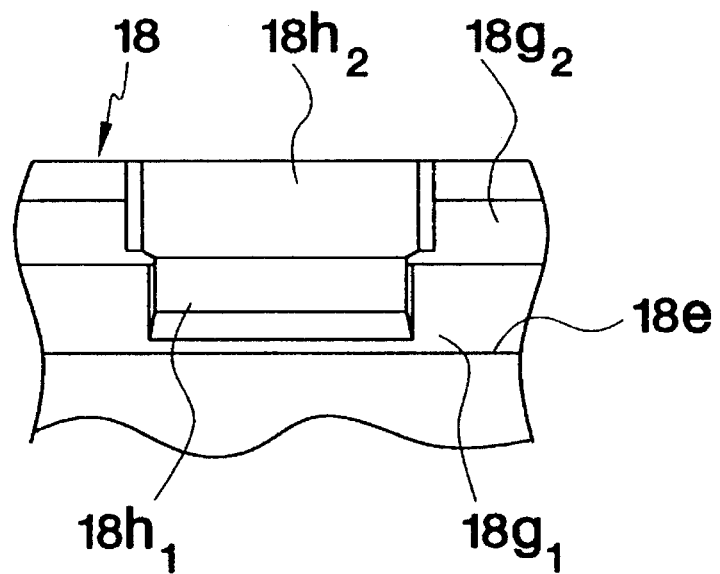

Various configurations for the valve element 18 of a thermally controlled valve according to the present invention are shown in FIGS. 12–14. The valve element 18 includes ring lips $18g_1$ and $18g_2$, as well as cooling water passageways $18h_1$ and $18h_2$. At least one (two are illustrated) small cooling water passageway $18h_1$ are provided in the first ring lip $18g_1$, and at least one (two are illustrated) large cooling water passageway $18h_2$ is provided in the second ring lip $18b_2$.

The fourth embodiment of the thermally controlled valve according to the present invention, shown in FIG. 12, includes a semi-cylindrical small cooling water passageway $18h_1$ opening into the base of an expanding semi-funnel shaped large cooling water passageway $18h_2$.

The fifth embodiment of the thermally controlled valve according to the present invention, shown in FIG. 13, includes a tapered arcuate small cooling water passageway $18h_1$ associated with a tapered arcuate large cooling water passageway $18h_2$.

The sixth embodiment of the thermally controlled valve according to the present invention, shown in FIG. 14, includes inwardly flared arcuate small cooling water passageway $18h_1$ associated with a tapered arcuate large cooling water passageway $18h_2$.

Figure 15:
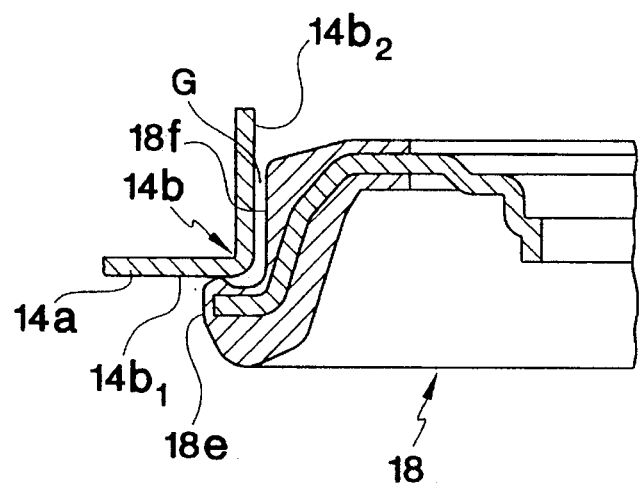
FIG. 15 is an enlarged segment view showing a valve element and a valve seat according to the present invention (in a closed position).

A seventh thermally controlled valve according to the present invention, shown in FIG. 15, is also comprised of a valve element 18 and a valve seat 14b. The valve seat 14b includes a substantially horizontal portion $14b_1$ and a substantially vertical portion $14b_2$. The valve element 18 includes a substantially horizontal portion 18e which contacts with and separates from the horizontal portion $14b_1$, and a substantially vertical portion 18f separated from the vertical portion $14b_2$ by a specified spacing "G".

Figure 16A:
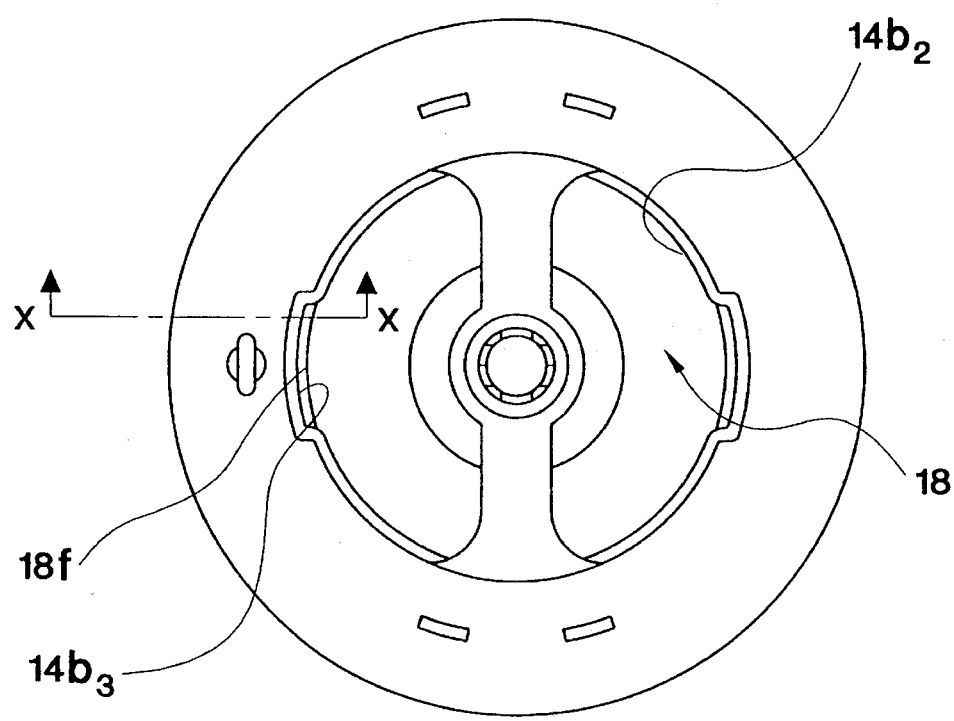
FIG. 16A is a plane view of another thermally controlled valve according to the present invention.
Figure 16B:
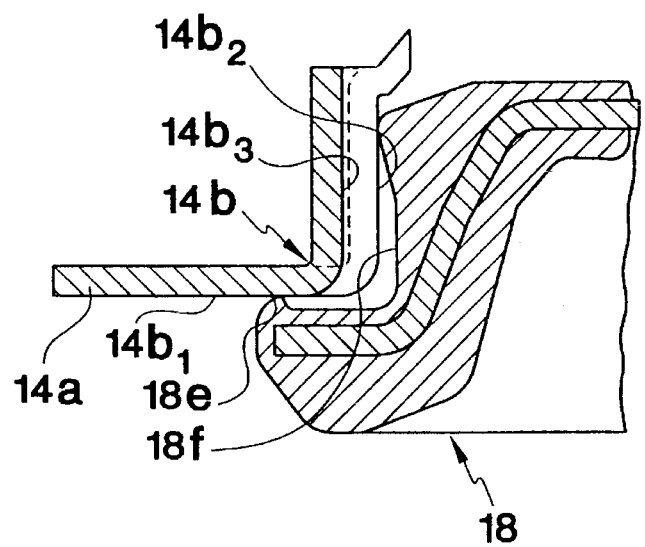
FIG. 16B is a cross-section taken along line 16B—16B in FIG. 16A.

An eighth thermally controlled valve according to the present invention, shown in FIG. 16, is also comprised of a valve element 18 and a valve seat 14b. The valve seat 14b includes a substantially horizontal portion $14b_1$ and a substantially vertical portion $14b_2$ which the valve element 18 contacts with and separates from. The valve seat 14b further includes at least one (two are illustrated) vertical portion $14b_3$ having a diameter each larger than that of the vertical portion $14b_2$. The vertical portion(s) $14b_3$ are provided on the circumference of the vertical portion $14b_2$.

Figure 2:
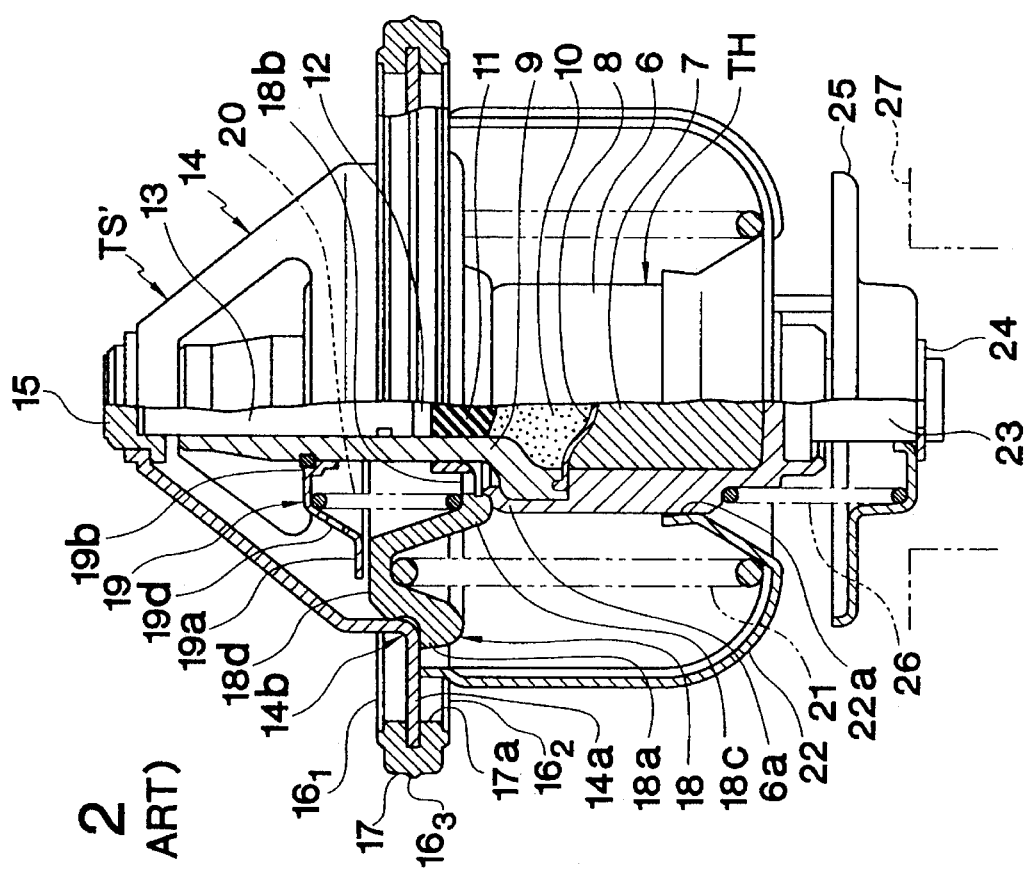
FIG. 2 is a cross-section view of a conventional vertical two-stage thermally controlled valve (in a closed position).
Figure 1:
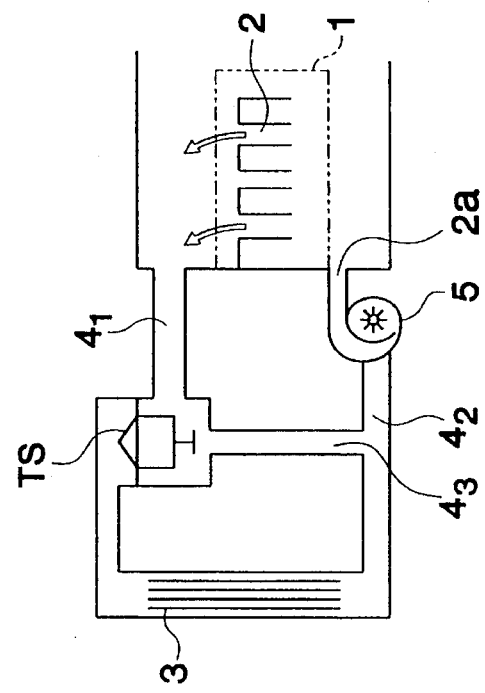
FIG. 1 schematically illustrates a cooling system for an internal combustion engine including a thermally controlled valve.
Figure 3A:
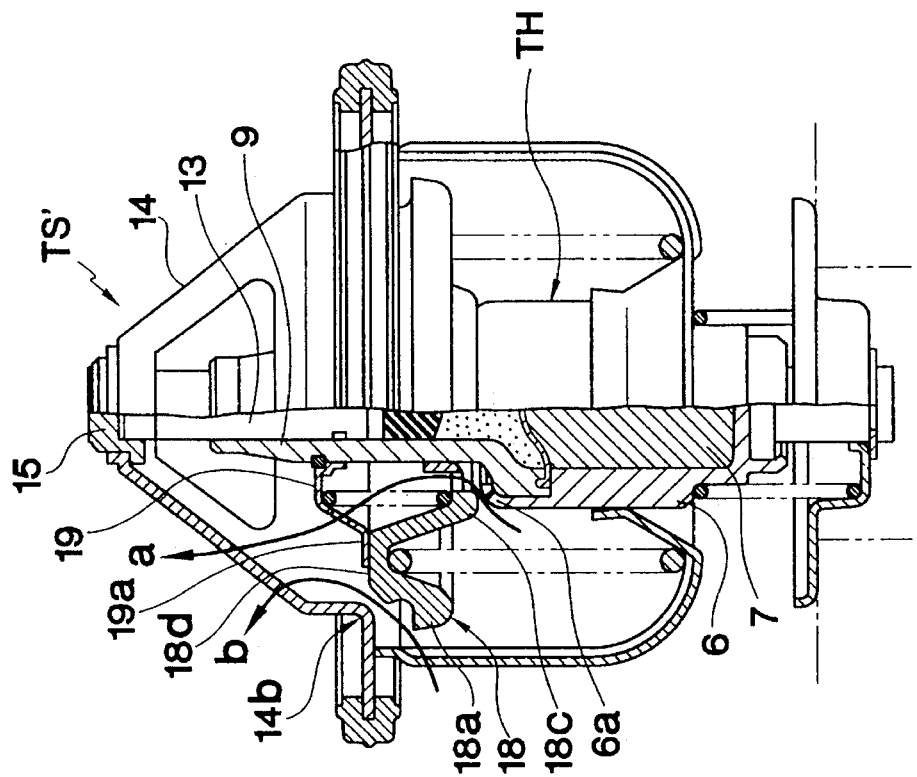
FIGS. 3A and 3B illustrate the operation of the conventional vertical 2-stage thermally controlled valve shown in FIG. 1.
Figure 3B:
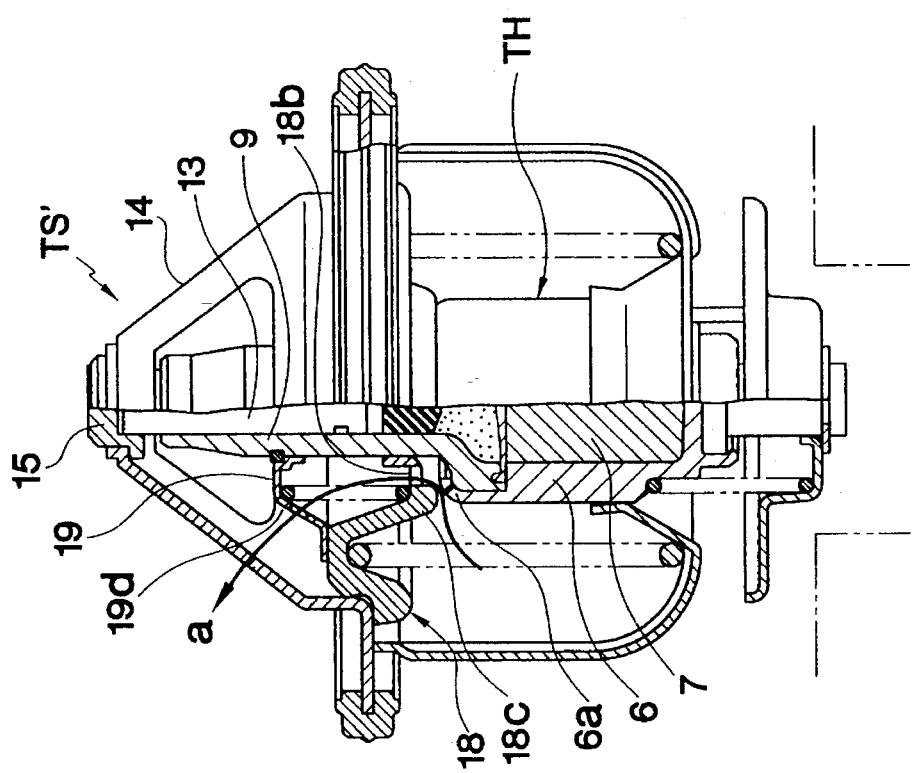
Figure 5:
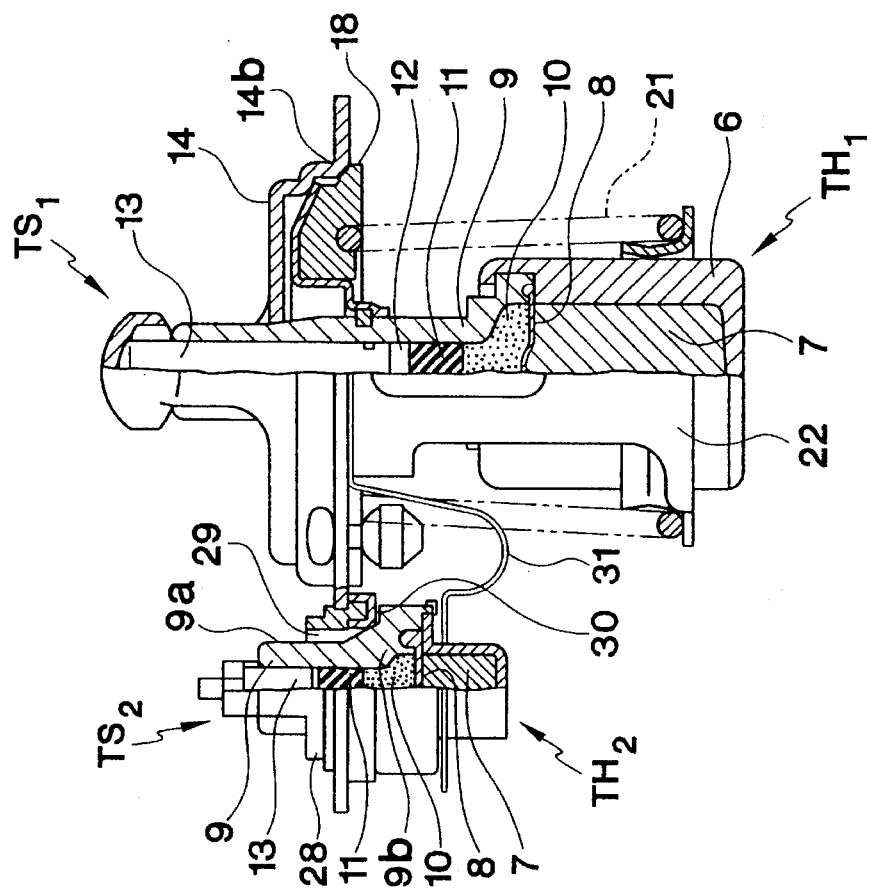
FIG. 5 is a cross-section view of the conventional thermally controlled valve shown in FIG. 4 (in a closed position).
Figure 4:
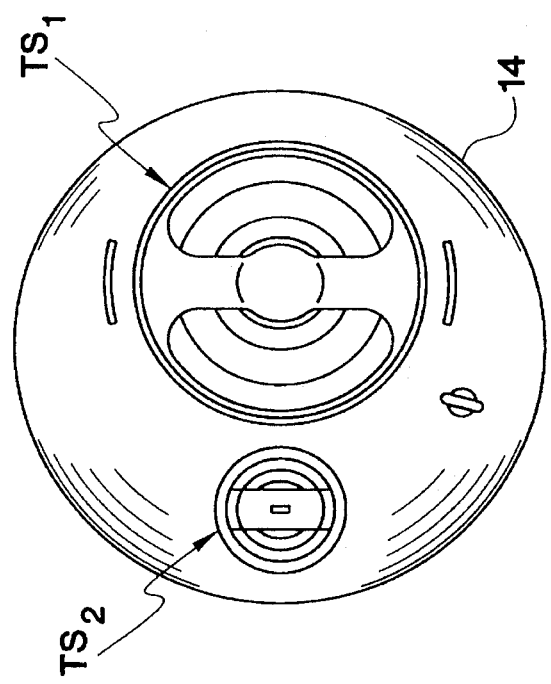
FIG. 4 is a plane view of a conventional thermally controlled valve having a sub-valve.

A variation of the thermally controlled valve according to the present invention, shown in FIGS. 7 and 9, is comprised of a valve element 18, fastened to a guide cylinder 9 of a thermo-element TH, and a valve seat 14b. The thermo-element TH includes a thermally expanding unit 7 housed in a case 6, and a guide cylinder 9 connected with the case 6 slidably supported by a moving unit 13. The tip end of the moving unit 13 is supported by a top end 14c' of a supporting portion 14c of the valve seat body 14. Compared with FIG. 2, the support unit 15 and the spring (unnumbered) interposed between the support unit 15 and the moving unit piston 13 are eliminated.

Figure 9B:
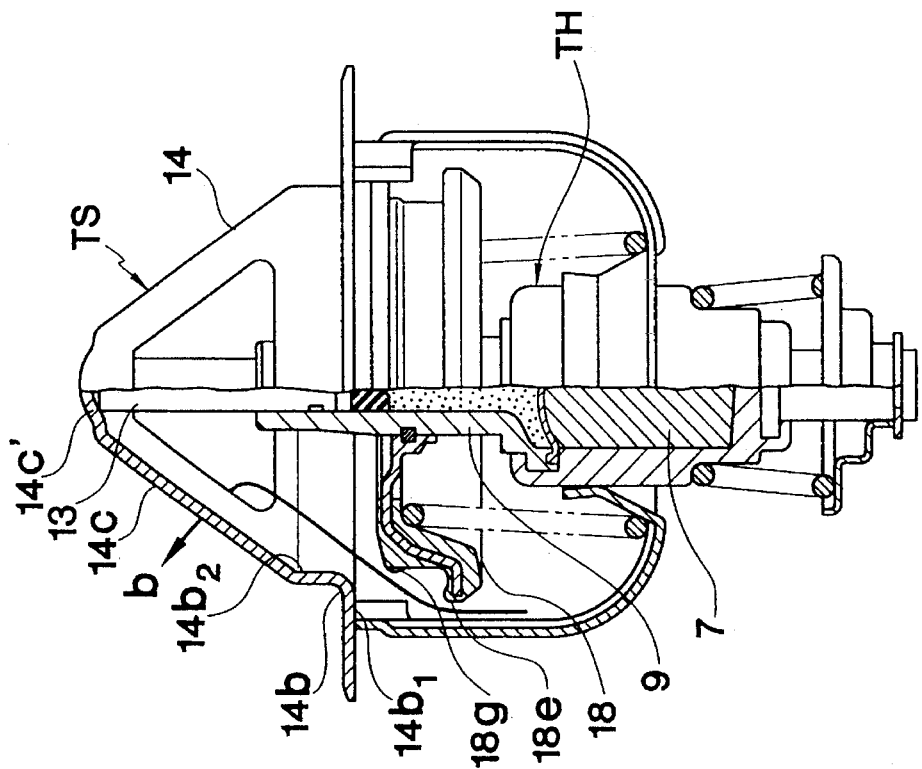
FIGS. 9A and 9B illustrate the operation of the thermally controlled valve according to the present invention shown in FIG. 7.
Figure 9A:
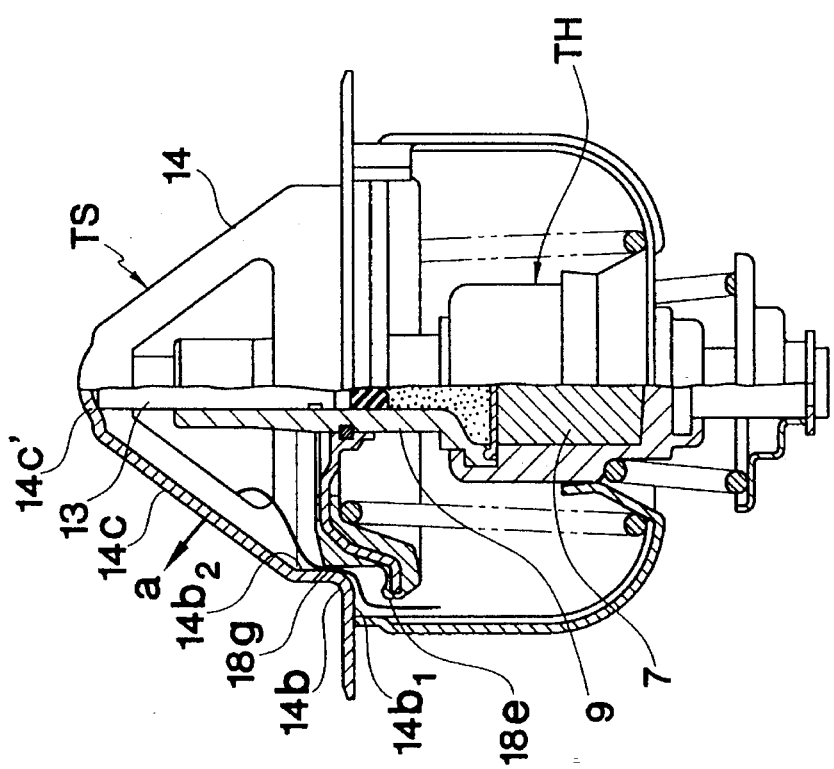
Figure 10B:
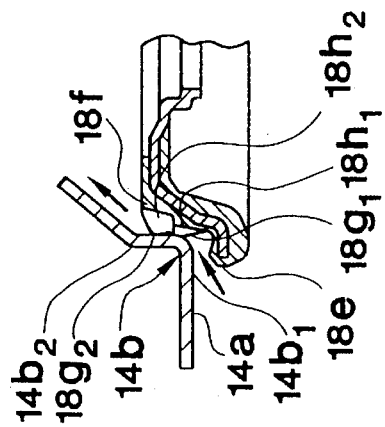
FIGS. 10A to 10D illustrate the operation of the valve element and valve seat according to the present invention as shown in FIG. 8.
Figure 10D:
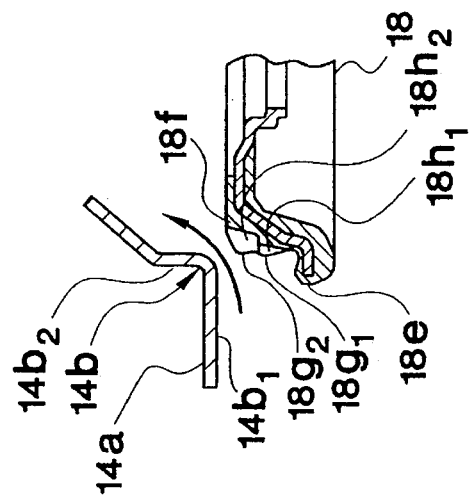
Figure 10A:
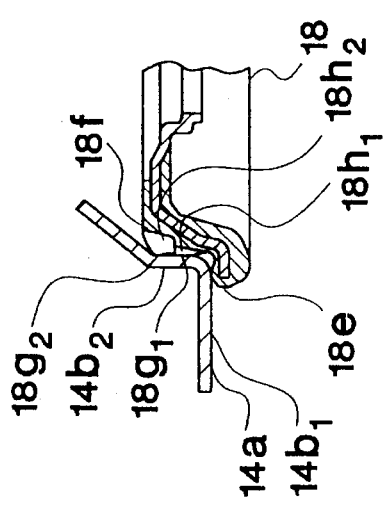
Figure 10C:
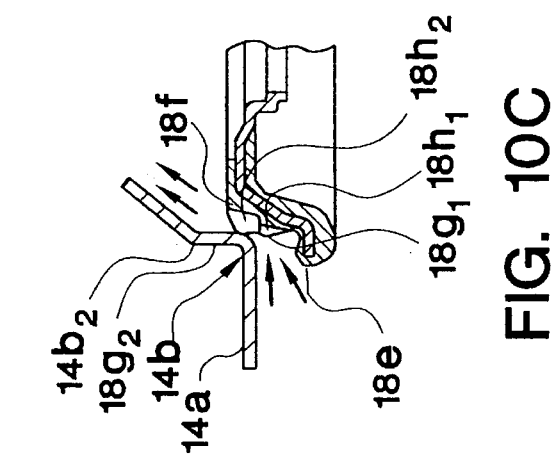

Operation of the thermally controlled valve according to the present invention illustrated in FIGS. 7–9 occurs as the cooling water temperature increases. The tip end of the moving unit 13 is held by the top end 14c', consequently the moving unit 13 does not move during relative displacement caused by the entire thermo-element TH. As a result, the horizontal portion 18e of the valve element 18 separates from the horizontal portion $14b_1$ of the valve seat 14b, however, the ring lip 18g formed on the vertical porion 18f remains in contact with the vertical portion $14b_2$ and the cooling water only flows through passageway 18h as shown by arrow "a" in FIG. 9(A). When the temperature increases further, the ring lip 18g formed on the vertical portion 18f separates from the vertical portion $14b_2$ of the valve seat 14b to allow more cooling water to flow as shown by arrow "b" in FIG. 9(B).

Operation of the thermally controlled valve according to the present invention illustrated in FIGS. 10–12 also occurs as the cooling water temperature increases. The tip end of the moving unit 13 is held by the top end 14c', consequently the moving unit 13 does not move during relative displacement caused by the entire thermo-element TH. As a result, the horizontal portion 18e of the valve element 18 separates from the horizontal portion $14b_1$ of the valve seat 14b. However, the ring lip $18g_1$ formed on the vertical portion 18f remains in contact with the vertical portion $14b_2$ and the cooling water only flows through the passageway $18h_1$ as indicated by the arrows in FIG. 10(B). When the temperature increases further, the first ring lip $18g_1$ separates from the vertical portion $14b_2$, but the second ring lip 18g still stays on the vertical portion $14b_2$ such that additional cooling water flows through the passageway $18h_2$ as indicated by the arrows in the FIG. 10(C). When the temperature increases yet further, the second ring lip $18g_2$ separates from the vertical portion $14b_2$ and the cooling water flows as indicated by the arrow in FIG. 10(D).

Operation of the thermally controlled valve according to the present invention illustrated in FIG. 15 also occurs as the cooling water temperature increases. The tip end of the moving unit 13 is held by the top end 14c', consequently the moving unit 13 does not move during relative displacement caused by the entire thermo-element TH. As a result, the horizontal portion 18e of the valve element 18 separates from the horizontal portion $14b_1$ of the valve seat 14b to allow cooling water to flow through the specified spacing "G" between the vertical portion 18f and the vertical portion $14b_2$. When the temperature increases, the vertical portion 18f separates from the $14b_2$ completely to allow more cooling water to flow.

Operation of the thermally controlled valve according to the present invention illustrated in FIG. 16 also occurs as the cooling water temperature increases. The tip end of the moving unit 13 is held by the top end 14c' consequently the moving unit 13 does not move during relative displacement caused by the entire thermo-element TH. The horizontal portion 18e of the valve element 18 separates from the horizontal portion $14b_1$ whereby a small volume of cooling water is allowed to flow through the vertical portion(s) $14b_3$ having a larger diameter than that of the vertical portion $14b_2$. When the temperature increases further, the valve element 18 separates completely from the vertical portion $14b_3$ allowing much more cooling water to flow.

Figure 17:
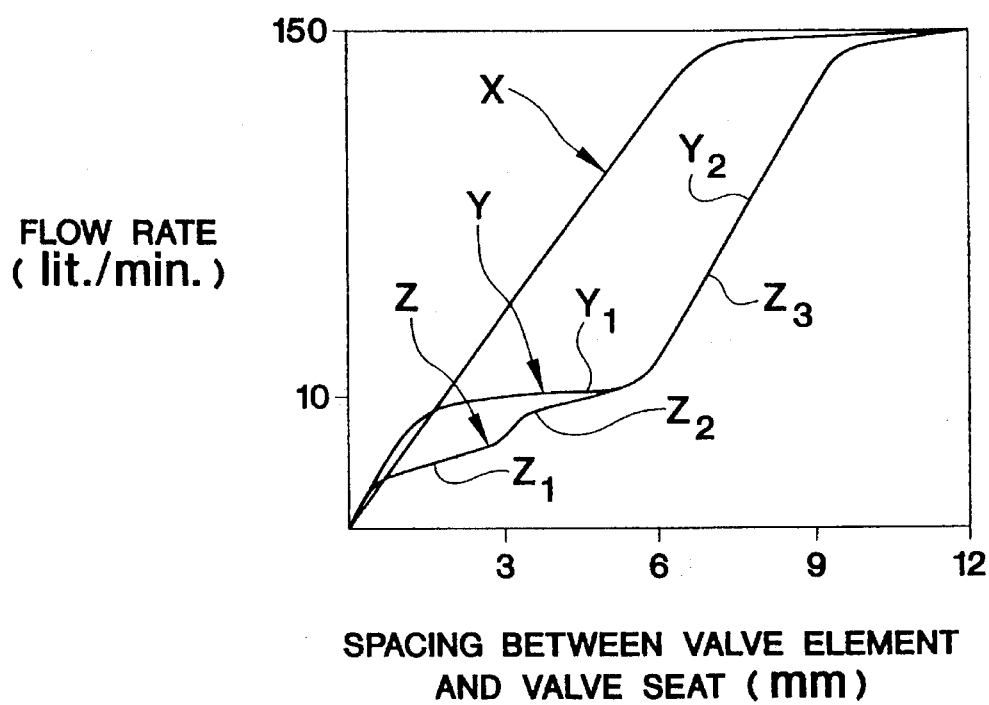
FIG. 17 is a graph showing the flow rate properties of the thermally controlled valve according to the present invention as compared with those of a conventional thermally controlled valve.

The detailed differences between thermally controlled valves according to the present invention and conventional thermally controlled valves are described with respect to FIG. 17. The ordinate axis logarithmically indicates the cooling water flow rate of a conventional thermally controlled valve (X), the flow rate of a thermally controlled valve according to the present invention having one ring lip 18g (Y), and of flow rate of a thermally controlled valve according to the present invention having two ring lips $18g_1$ and $18b_2$ (Z). The abscissa axis indicates the spacing between the valve element 18 and the valve seat 14b.

The flow rate X for the conventional thermally controlled valve increases at a fixed gradient proportional to the spacing between the valve element and the valve seat.

The flow rate Y for the thermally controlled valve according to the present invention having one ring lip 18g provided with a cooling water passageway 18h is low during such time $Y_1$ as the ring lip 18g remains in contact with the vertical portion $14b_2$. During such time $Y_2$ as the ring lip 18g separates from the vertical portion $14b_2$, the flow rate increases in proportion to the spacing between the valve element and the valve seat.

The desired gradient for the flow rate of the cooling water flowing through the cooling water passageway 18h during the time $Y_1$ may be adjusted by designing the size and shape of the cooling water passageway 18h.

The flow rate Z for the thermally controlled valve according to the present invention having two ring lips $18g_1$ and $18g_2$ provided with the cooling water passageways $18h_1$ and $18h_2$ is low during such time $Z_1$ as the first ring lip $18g_1$ remains in contact with the vertical portion $14b_2$. The flow rate is increased during such time $Z_2$ as the first ring lip $18g_1$ separates from the vertical portion $14b_2$ and the second ring lip $18g_2$ remains in contact with the vertical portion $14b_2$. During such time $Z_3$ as both the first ring lip $18g_1$ and the second ring lip $18b_2$ separate from the vertical portion $14b_2$, the flow rate increases more.

Again, the desired gradient for the flow rates of the cooling water flowing through the cooling water passageways $18h_1$ and $18h_2$ during the times $Z_1$ and $Z_2$ may be adjusted by designing the sizes and shapes of the cooling water passageways $18h_1$ and $18h_2$.

As described above, an increase in the temperature of the cooling water opens an initial, small flow of cooling water between the engine and the radiator. When the temperature increases further, the valve opens more widely to allow more cooling water to flow.

In this way, a large amount of the cooling water is prevented from initially flowing immediately after opening the valve. Because the initial flow is restrained, thermal hunting can be eliminated. In addition, a variety of thermally controlled valves having optimum flow rate properties for a particular model of automobile can be designed by varying:

1) the position and shape of the ring lips formed on the vertical portion of the valve element;

2) the number and size of the cooling water passageways formed on the ring lips; and, 3) the spacing between the vertical portions of the valve element and the valve seat.

It is noteworthy that the advantages derived by the present invention can be achieved by modifying only the valve element and the valve seat, therefore the thermally controlled valve according to the present invention can be assembled with fewer parts and hence a less complex assembly process as compared with conventional vertical 2-stage thermally controlled valves or conventional thermally controlled valves having a sub-valve.

What is claimed is:

1. A thermally controlled valve for regulating the flow of cooling fluid, the thermally controlled valve including a longitudinal axis and comprising:

a valve element moved by a thermo-element, movement of said thermo-element is in response to temperature changes in the cooling fluid;

a valve seat which contacts with and separates from said valve element, said valve seat includes a horizontal portion which is substantially parallel to the longitudinal axis and a vertical portion which is substantially orthogonal to the longitudinal axis;

said valve element includes a horizontal face which contacts with and separates from said horizontal portion of said valve seat and a vertical face which contacts with and separates from said vertical portion of said valve seat;

a first raised ring lip on said vertical face of said valve element, said first raised ring lip generally circumscribes said elastic valve element about the longitudinal axis; a second raised ring lip on said vertical face of said valve element, said second raised ring lip generally circumscribes said valve element about the longitudinal axis; and, a first cooling fluid passageway provided on said first raised ring lip, said first cooling fluid passageway extends substantially parallel to the longitudinal axis a second cooling fluid passageway provided on said second raised ring lip, said second cooling fluid passageway extends substantially parallel to the longitudinal axis.

2. The thermally controlled valve according to claim 1, further comprising:

a plurality of said first cooling fluid passageways, said plurality of said first cooling fluid passageways are spaced around an exterior circumference of said valve element and confront said horizontal portion of said valve seat; and, a plurality of said second cooling fluid passageways, said plurality of said second cooling fluid passageways are spaced around said exterior circumference of said valve element and confront said horizontal portion of said valve seat.

3. The thermally controlled valve according to claim 1, further comprising:

a substantially uniform gap interposed between said horizontal portion of said valve seat and said horizontal face of said valve element.

4. The thermally controlled valve according to claim 1, wherein said thermo-element includes a tip end secured to a supporting portion of said valve seat body.

5. A thermally controlled valve for regulating the flow of cooling fluid, the thermally controlled valve including a longitudinal axis and comprising:

a valve element moved by a thermo-element, movement of said thermo-element is in response to temperature changes in the cooling fluid;

a valve seat which contacts with and separates from said valve element, said valve seat includes a horizontal portion which is substantially parallel to the longitudinal axis and a vertical portion which is substantially orthogonal to the longitudinal axis;

said valve element includes a horizontal face which contacts with and separates from said horizontal portion of said valve seat and a vertical face which contacts with and separates from said vertical portion of said valve seat;

a first raised ring lip on said vertical face of said valve element, said first raised ring lip generally circumscribes said valve element about the longitudinal axis a second raised ring lip on said vertical face of said valve element, said second raised ring lip generally circumscribes said valve element about the longitudinal axis; and, a first cooling fluid passageway provided on said valve seat, said first cooling fluid passageway extends substantially parallel to the longitudinal axis a second cooling fluid passageway provided on said second raised ring lip, said second cooling fluid passageway extends substantially parallel to the longitudinal axis.

6. The thermally controlled valve according to claim 5, further comprising:

a plurality of said first cooling fluid passageways, said plurality of said first cooling fluid passageways are spaced around an interior circumference of said valve seat and confront said valve element.

* * * * *